Oct. 29, 1957 N. S. BRODY 2,811,162
TENSION PLIABLE, ADJUSTABLE, DENTAL TOOTH PICK DEVICE
Filed Oct. 31, 1955
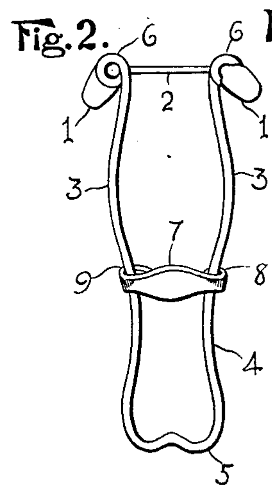
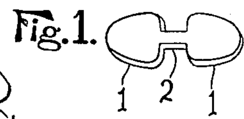
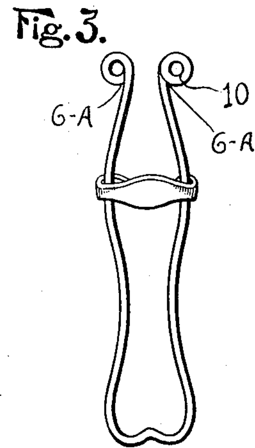
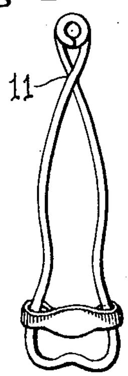
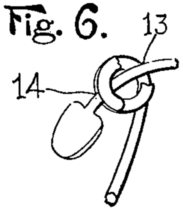
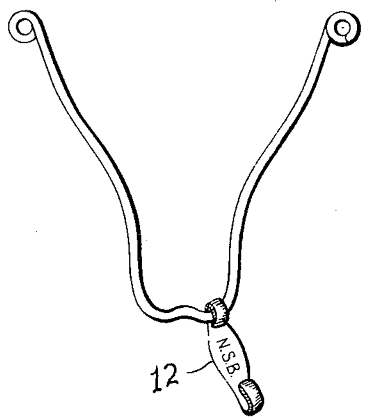
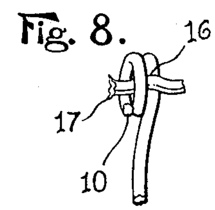
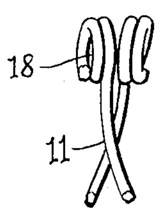
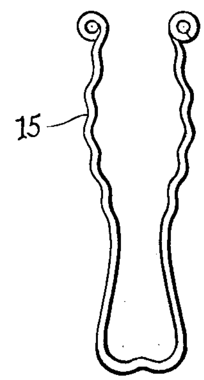
Nathan S. Brody
INVENTOR.

United States Patent Office 2,811,162

Patented Oct. 29, 1957

2,811,162

TENSION PLIABLE, ADJUSTABLE, DENTAL TOOTH PICK DEVICE

Nathan S. Brody, Los Angeles, Calif.

Application October 31, 1955, Serial No. 543,754

5 Claims. (Cl. 132—89)

My invention relates to a tension pliable, adjustable, dental tooth pick device for extracting food particles, food tissue and the like from between the crowns of closely grown teeth as also for cleaning the spaces in cavities between the teeth adjacent to the gums.

One of the objects of my invention is to provide an efficient, convenient and sanitary, tension pliable, tooth pick device incorporating in sub combination an elastic cleaning element and an adjustable movable brace hook, said elastic element adapted to wedge through and between closely grown crowns of teeth to remove food particles and the like with safety and ease in lieu of the conventional rigid tooth picks which can not conveniently enter between closely grown teeth and crowns, while said adjustable brace hook permits the controlled attenuation of said elastic element or the contraction of same as may be wanted to accommodate narrow or wider spaces between the teeth.

Another object of my invention is to provide an efficient, tension pliable and adjustable dental tooth pick device integrally employing an elastic cleaning element, said latter adapted to be retained with said tooth pick when not in use for said elastic element is so fashioned and having grip ends by which it is retained or can be removed and changed as wanted.

A special object of my invention is to provide a tension pliable, dental tooth pick of the character described which can be twisted into a narrow unit and can thus be conveniently carried in a pocket or purse in lieu of the conventional rigid tooth picks which pierce and work themselves through the lining of pockets.

An important object of my invention is to provide an improved dental tooth pick to the heretofore wooden tooth picks in common use, and those made of other rigid material, such as bone etc. which tend to bleed the gums, to spread and to loosen the teeth and are the cause of much pyorrhea, as the dentists and the medicians claim. My invention of the above described character provides a tooth pick and teeth cleaner which removes the food particles and the like caught between closely grown crowns of teeth with ease and with not incurring the slightest harm to the teeth or gums.

In the accompanying drawings Fig. 1 is an enlarged face view of the elastic cleaning element of my invention showing the grip ends and the short narrow midsection thereof. Fig. 2 is an enlarged front view of my invention fully assembled ready for use. Fig. 3 presents my invention minus said elastic cleaning element and having said adjustable brace hook moved up to the upper concaves of said arms. Fig. 4 is a perspective of said tension pliable arms twisted and caught thus locking at their oppositely and reversely spiraled ends. Fig. 5 presents the elongated spiraled-end arms of my invention unhooked from said adjustable brace hook thus enabling the spreading of said arms to regain tension. Fig. 6 is a perspective of a spiraled end of said arms indicating how said elastic cleaning element is inserted therein. In Fig. 7 said arms are shown to have extended spiral waves formed in their upper concaved sections which condition provides for a firmer grip-hold upon said dental tooth pick when in use. Fig. 8 is a rear perspective of said spiral indicating said extenuated neck section of said elastic element contained therein. In Fig. 9 is presented a rear and front view of said spiraled arms in the process of being twisted and thus causing them to be caught and locked.

In practicing my invention in the embodiment illustrated in Fig. 2 and in the other figures I provide a holder preferably made of round tension wire indicated by the characters 3, to 6, inclusive representing an elongated body having a pair of spaced arms 3, 3, said arms culminating into outwardly and reversely wound coils at their ends 6, 6, extending and emanating from a cleft, rounded bottom section 5; said extending arms additionally being fashioned into upper concaves 3, 3, and into lower convexes 4 which when actuated by the controlled movements of said brace hook 7, 8, and 9 permit said tension arms to expand and to attenuate said neck section 2, of said elastic element as shown in Fig. 2, or to contract said arms as illustrated in Fig. 3 which position is had when inserting or removing said elastic element into or from said spirals of said arms 6, 6, in Fig. 2 and 6–A, 6–A, and 10 in Fig. 3; additionally said cleft, rounded bottom section 5, formed and fashioned as it is, serves to retain and to increase the spring tension for said extending arms of said wire body comprising in part said dental tooth pick of my invention.

As a further reference to the practice and use of my invention described above, I integrally employ an elastic cleaning element as a member incorporated in my invention illustrated in Fig. 1; said element being fashioned specifically and adapted to be inserted between said spirals and to be held within said coils of said tension pliable, spaced, arms of said dental tooth pick; said elastic cleaning element consisting of two grip ends 1, 1 connected by a narrow midsection 2 as illustrated in Fig. 1. Additionally portraying the efficacy and the modifications of said elastic cleaning element are had in the Figures 2, 6, and 8; thus in Fig. 6 is presented the procedure of inserting the narrow midsection of said elastic element between the spirals as also the removing of the same from the spirals 14, 13; in Fig. 8 is clearly shown the position of said attenuated narrow midsection as it is wedged between said spirals 16; 17 illustrates a portion of said grip end and how it is contracted and held within said coil 18, in Fig. 9 while 10 indicates the end of said spiral adapted to permit the insertion of said elastic element as also the removal of said elastic element from said spirals by simply reversing the procedure of inserting same.

Additionally, in practicing my invention in the embodiment illustrated in Fig. 2 I integrally employ an adjustable, movable brace hook likewise a member of and is incorporated in my invention; said brace hook is preferably fashioned of thin metal plate being wider in its midcenter 7, and having two narrow extremities 8, and 9 and while 8 is movably attached to the one tension pliable arm of said tooth pick, said second extremity 9 is fashioned into a hook means clearly illustrated in Fig. 5; the modifications engendered by said movements of said brace hook upon said tension pliable arms and upon said elastic cleaning element can be seen in Figs. 2 and 3; in Fig. 5 said brace hook is shown unhooked from said second arm thus permitting the spreading of said arms to regain lost tension when wanted while 12, illustrates how said wider midsection of said brace hook serves as an identification means. In Fig. 9 is a perspective of the two oppositely, outwardly and reversely wound spirals of said arms in the process of being twisted 11, and locked as also shown in Fig. 4; this adaptation of my invention— fashioned in the proper gage of tension wire—enables it to become compact thus convenient for the carrying in a pocket or purse in lieu of the sharply pointed conventional, rigid tooth picks which work themselves through the lining of pockets etc. In Fig. 7 I present the elongated tension pliable holder of my invention having extended spiral waves formed in the upper concaved sections of said spaced arms and which feature I am incorporating in my invention, said extended spirals serve to provide a firm non-slip hold upon said dental tooth pick in the process of handling same and when fully assembled and in use. Another expediency is provided by said concaved upper sections of said arms which serve as a convenient means of unlocking said spiraled ends of said arms by simply pressing inwardly upon their midsections; additionally, said convexes and concaves together with said movably adjustable brace hook provide for the controlled expansion and contraction of said tension pliable arms which integrally cause the attenuation of said elastic cleaning element incorporated in my invention.

Having described my invention I claim:

1. A dental tension pliable, adjustable tooth pick device of the character described, comprising, an elongated tension pliable wire body having a pair of spaced arms culminating into outwardly, oppositely and reversely wound spirals at their ends; said elongated body being roundedly cleft at its bottom section while said pliable arms extending therefrom are also formed into upper concaved sections and into lower convexed sections; an elastic cleaning element having two grip ends and a short, narrow midsection, integrally incorporated and practiced with said tension pliable wire body, said narrow midsection of said elastic element adapted to attenuate or to contract; an adjustable and movable brace hook integrally practiced and incorporated with said tension wire body and said elastic cleaning element, said brace hook being movable attached to the one arm of said wire body at its one end, while its second extremity being formed into a hook means adapted to hook on and off said second arm of said tension wire body of said dental tooth pick device.

2. A device as set forth in claim 1, wherein the outwardly wound spirals provide for locking the same together when twisted at their upper sections and permitting the coils to be mutually and adjacently caught, and said concaved upper sections being fashioned into extended spiral waves to provide a non-slip grip.

3. A device of the character described and as set forth in claim 1, wherein said outwardly wound spirals to terminate at the bottom midsections of said coils thus assuring safety of application of said device within the mouth and not to injure the gums by said terminating end of the coils when coming in contact with same; and wherein the ends of said coils being somewhat outwardly fashioned to permit convenient removal of said elastic cleaning element from the spirals by reversing procedure of inserting same.

4. A dental tooth pick device of the class described and as set forth in claim 1, wherein said brace hook having a wider midsection thus to provide for individual initialed identification as a sanitary means of protection, and said brace hook when unhooked from the one arm of said wire body permits the spreading of said arms to regain lost tension incurred in the process of practicing said dental device in the full assembly thereof.

5. In a dental tooth pick device comprising: a non corrosive, tension pliable wire body, preferably made of stainless spring steel, an elastic cleaning element, formed of a material such as rubber, and an adjustable, movable brace hook, likewise preferably formed of stainless metal—the above to meet the sanitary conditions implied in the use and application of said dental device; said wire body being adequately elongated to provide for holding the same, and constituting two identical, sectionally and oppositely curved arms and a roundedly cleft bottom section; said upper sections of said arms being formed into extended spiral waves while the ends thereof being wound into outward spiral coils terminating at their bottom midsections; said elastic cleaning element constituting a narrow midsection and two grip-ends being integrally received, held and practiced with said wire body, thus said grip-ends are positioned and held within said coils while the midsection extends between said two arms; said brace hook, movably attached and hooked on to said arms, provides the controlled tension spread of said arms by its adjusted movements up or down along said curved arms, the latter, in turn, extend or check the attenuation of said elastic midsection to provide for the cleaning of narrow and wider spaces between teeth in practicing said dental tooth pick device in the full assembly thereof, as substantially described.

References Cited in the file of this patent

UNITED STATES PATENTS 2,176,069 Goulet ---------------- Oct. 17, 1939

FOREIGN PATENTS 15,446 Great Britain ------------ July 4, 1913